Patented Feb. 25, 1936

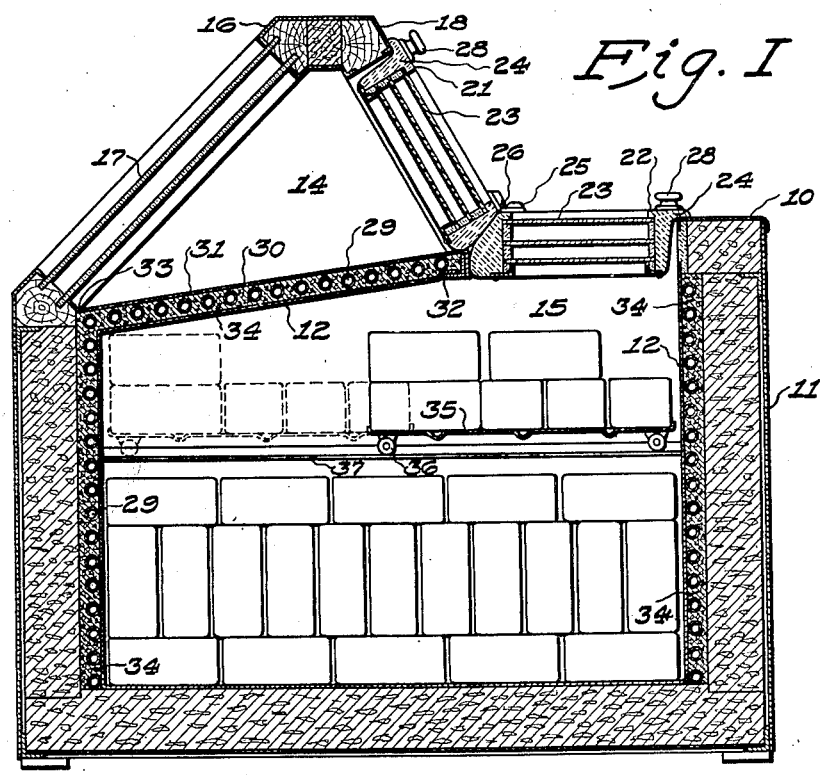
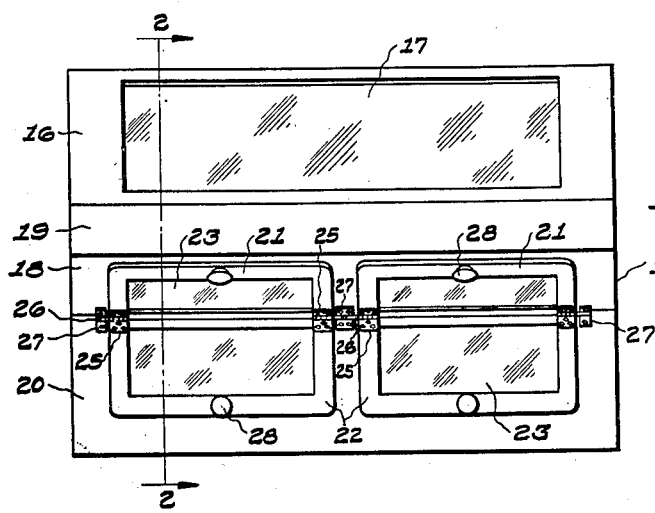

2,032,234

UNITED STATES PATENT OFFICE 2,032,234

LOW TEMPERATURE DISPLAY CASE

Charles C. Thomas and Don G. Ellis, Detroit, Mich., assignors to Kelvinator Corporation, Detroit, Mich., a corporation of Michigan Application December 13, 1930, Serial No. 502,167

1 Claim. (Cl. 62—89.5)

This invention relates to refrigerated storage and display cases, and more particularly to cases of that type adapted to be refrigerated by mechanical refrigerating apparatus.

The principal object of this invention is the provision of an inexpensive refrigerated storage and display case adapted to be operated at relatively low temperatures.

Recently a new art of preserving fresh foods has been developed whereby such foods as fresh fruits, vegetables and meats may be preserved indefinitely. This process comprises subjecting the food to an extremely low temperature so that it will freeze quickly. When so frozen the water contained therein does not separate from the solid matter and form large crystals as is the case when food is frozen slowly. It is these crystals formed in slowly frozen foods that destroy the freshness and flavor of such food by bursting the cell structures thereof. In the quickly frozen foods the water and solid matter are frozen simultaneously and the cell structures remain intact. As long as the quickly frozen foods are kept at a relatively low temperature, generally speaking something below 10° above zero Fahrenheit, they will retain all of their original freshness and flavor. The refrigerated storage and display cases in use heretofore have been of massive and expensive construction and are not adapted to be operated at temperatures low enough for the satisfactory preservation of these so-called quick frozen foods. The development of a widespread use of these foods is therefore being retarded by a lack of suitable merchandising equipment, and due to the excessive cost of the equipment that is available for merchandising this commodity.

The simplified and inexpensive construction of the refrigerated storage and display case embodying this invention eliminates one of the obstructions to the development of the quick frozen food industry. However, the lack of suitable merchandising equipment is perhaps an even more serious obstruction to this development. The low temperature cases now in use for preserving normally refrigerated foods could be used for preserving the frozen foods if it were not for the fact that the refrigerant evaporators employed in the present day cases need to be defrosted frequently particularly when operated at extremely low temperatures. During the defrosting process any quick frozen foods which may be disposed within a case employing the conventional type of evaporator would become thawed out. While experiment has shown that all of the freshness and original flavor of fresh fruits, vegetables, and meats that have been subjected to the quick freezing process will be retained therein as long as they are kept at a relatively low temperature, it has been found that once they become thawed out they must be used within a reasonable time or they will deteriorate just as though they had never been frozen and quite likely in a shorter period of time. Obviously, then, a case which must frequently be subjected to a high enough temperature to defrost the evaporator used therein is not suitable for the preservation of quick frozen foods.

There are several factors which contribute to cause the collection of moisture in the form of frost on a refrigerant evaporator used in a low temperature case. The conventional refrigerant evaporator used in these cases consists either of an elongated tube evaporator or a shorter tube evaporator in the form of a header, with elongated pipe loops associated therewith. Frequently the pipe loops in this type of evaporator are provided with fins secured to the pipe loops at right angles to the axes thereof. In order for an evaporator of this type to refrigerate a display case it must be positioned relatively near the top of the case and operated at a temperature somewhat below that desired in the case in order to establish a temperature differential whereby the air within the case is made to circulate about the evaporator. The circulation of air must be practically continuous in order that heat leaking into the case through the walls thereof and through the doors when they are opened may be picked up by the evaporator. It will be readily apparent that, as a result of constantly passing the air in the case over the evaporator, whatever moisture is contained in the air, over and above the saturation point of air at the temperature at which the evaporator is being operated, will be deposited on the evaporator in the form of frost. As this frost continues to collect on the surface of the evaporator it lowers the evaporator's thermal conductivity to such an extent that ultimately it is necessary to defrost the evaporator in order to obtain satisfactory refrigeration.

Inasmuch as a low temperature case employing an evaporator which must be defrosted is not suitable for the preservation of quick frozen foods, and since the defrosting of an evaporator is made necessary because of heat leakage and the circulation of air within the case, this invention has as a further object the provision of a refrigerated display case having an evaporator adapted to restrict the circulation of air therein and to intercept the flow of heat into the interior of the case.

Because of the fact that it is practically impossible to prevent all circulation of air within a refrigerated storage or display case, and all leakage of heat into the interior thereof, there will always be some deposit of frost on evaporators employed in cases of this type. It will be apparent, therefore, that it is necessary to defrost an evaporator employed in a low temperature case even though the circulation of air within the case is greatly restricted, and the leakage of heat into the case is substantially stopped. Since the objection to defrosting the evaporator in a low temperature case is based entirely upon the fact that to do so necessitates raising the temperature of the case sufficiently to melt the frost on the evaporator, the provision of means not entailing the raising of the temperature of the case for defrosting the evaporator in a low temperature case is essential. This invention therefore has as a still further object the provision of a low temperature refrigerated storage and display case employing an evaporator which is adapted to be defrosted without changing the temperature thereof.

In the drawing:

Figure 1 is a sectional view of the refrigerated storage and display case embodying this invention taken on line 2—2 of Figure 2.

Figure 2 is a plan view of the refrigerated storage and display case shown in Figure 1.

The low temperature case 10 embodying this invention is of exceedingly simple and inexpensive construction having its outer walls formed from a pair of spaced metallic shells 11 and 12 with insulating material 13 disposed therebetween. The case is divided into a display compartment 14 and a storage compartment 15. The front wall 16 of the display compartment 14 has its upper extremity inclined toward the rear of the case. This wall is provided with an opening substantially throughout its entire area which is adapted to receive a window section 17 comprising a plurality of spaced parallel plates of glass having their adjacent edges sealed into the wall 16 to prevent the circulation of air therebetween. The rear wall 18 of the display compartment 14 has its upper extremity inclined toward the front of the case and its lower extremity spaced toward the front of the case from the upper extremity of the rear wall of the storage compartment 15. The display compartment 14 has a horizontal top wall 19 disposed between the upper extremities of the front and rear walls 17 and 18, and the storage compartment 15 has a top horizontal wall 20 disposed between the upper extremity of its rear wall and the lower extremity of the wall 18.

The rear wall 18 of the display compartment 14 and the top wall 20 of the storage compartment 15 are provided with a plurality of similar and adjacent openings adapted to be closed by doors 21 and 22 respectively. The doors 21 and 22 are of similar construction comprising a plurality of spaced parallel plates of glass 23 having their adjacent edges sealed in insulated door frames 24. Each of the doors 21 and 22 are provided at the opposite extremities of their adjacent edges with corresponding parts 25 of a conventional door hinge. A plurality of rods 26 joining the parts 25 of the hinges together, and upon which the doors 21 and 22 may be rotated, are rigidly held in position at the junction of the rear wall 18 and the horizontal wall 20 by means of stationary hinge portions 27 secured to the walls. The doors are all provided with handles 28 by means of which they may be rotated on the rods 26 to an open position.

A definite purpose is served by placing the doors 22 providing access to the interior of the storage compartment 15 in a horizontal wall thereof. Due to the well known characteristic of air which causes cold air to seek a lower level than warm air, there will be no circulation through the door opening 22 so long as the air within the storage compartment 15 is colder than the air outside of the case 10. Inasmuch as it is contemplated that the interior of the compartment 15 will be maintained at a relatively low temperature there will be a sufficient difference between the temperature of the air contained therein and the air outside of the case to substantially prevent any loss of the cold air from the case or inflow of warm air into the case. The fact that the door 21 is positioned in a vertical wall of the display compartment 14 will not cause any particular loss of cold air from that compartment or inflow of warm air into it inasmuch as it is contemplated that this compartment will be used primarily for display of the contents of the case and all sales will be made from the contents of the storage compartment 15.

The display compartment 14 is separated from the storage compartment 15 by a partition 30 comprising a continuation of the inner metallic shell 12 and a metal sheet 31 spaced from the inner shell 12 and having its edges at its opposite ends and at one side sealed to the adjacent edges of the inner shell 12 as indicated at 32. The edge on the opposite side of the metal sheet 31 is sealed to the front wall of the storage compartment 15 as indicated at 33.

The contents of both the display compartment 14 and the storage compartment 15 are cooled by means of a refrigerant evaporator coil 29 of the so-called dry expansion type comprising a continuous length of sinuously disposed refrigerant conduit having one extremity in communication with the high side of a refrigerant condensing unit, not shown, and its other extremity in communication with the low side of the same unit. Suitable well known means, not shown, are employed for the purpose of admitting refrigerant to the evaporator coil 29 and for causing the condensing unit to operate in response to temperature variations within the case 10.

A portion of the refrigerant conduit forming the evaporator coil 29 is sealed within the vertical walls of the storage compartment 15 and disposed between the insulating material 13 and the inner metallic shell 12. The remainder of the refrigerant conduit forming the evaporator coil 29 is concealed within the partition 30 separating the display compartment 14 from the storage compartment 15. That part of the refrigerant evaporator coil 29 disposed within the vertical walls of the storage compartment 15 is preferably in direct metallic contact with the inner shell 12, and that portion of the evaporator 29 disposed within the partition 30 is preferably in contact with the metallic plate 31.

The space between the metallic plate 31 and the inner shell 12 and between the insulation material 13 and the inner shell 12 which surrounds the evaporator coil 29 is filled with any suitable holdover means 34 of good conductivity. While the holdover means illustrated in the drawing consists of a cement composition which is plastic when first mixed, so that it may be poured into the space that it is to occupy, and hardens quickly, it should be understood that the purposes of this invention may be served equally well by any other holdover means of good conductivity.

The partition 30 is adapted to support the contents of the display compartment 14. The evaporator embedded in the partition 30 cools these contents by means of conduction. The food contained in this compartment will therefore be preserved at a proper temperature even though a considerable amount of heat should leak through the sloping vertical walls or the horizontal top wall of this compartment. Normally if a solid substance of very low temperature comes in contact with warm air, ice crystal will be deposited on its surface. This will not happen to articles of food in the display compartment even if a relatively large amount of heat leaks into it because the food is itself a conductor of heat, and being in direct thermal contact with the evaporator coil will extract the heat from the air immediately adjacent it on all sides. There will therefore be what might be called a layer of cold air immediately above the food in this compartment.

The contents of the storage compartment 15 are supported by the bottom wall thereof and by a plurality of shelves 35 provided with wheels 36 adapted to support the shelves upon tracks 37 extending from the front to the rear wall of the compartment 15. It is contemplated that sales of merchandise selected by a purchaser from the display in the compartment 14 will be made from the contents of the trays 35 in the compartment 15. These trays are approximately one half of the length of the tracks 37 and may be pushed forward into the position shown in the dotted lines in Figure 1, to permit the user of the case 10 to withdraw the merchandise disposed beneath the trays and replenish the supplies carried by the trays when necessary. This arrangement permits the utilization of practically the entire space in the storage compartment 15 while at the same time providing for the read accessibility of the contents of that compartment.

Since the door 22 providing access to the interior of the storage compartment 15 is positioned in a horizontal wall thereof, and consequently restricts the circulation of air therethrough, and since the evaporator coil 29 is positioned in the vertical walls of the compartment 15 where it will intercept and absorb the heat leaking through the walls, it is apparent that there will be no particular circulation of air within the compartment 15 and that the contents thereof will be cooled by radiation and conduction.

Even though there is no particular circulation of air in the compartment 15 there will nevertheless be deposited on the inner metallic shell 12 a certain amount of frost representing moisture taken from the air adjacent the walls of the compartment. While this frost will not be enough to interfere particularly with the cooling of the compartment, it will undoubtedly accumulate to such extent as to require its removal from time to time. This can be done simply by scraping the frost off the metallic shell 12 and without materially changing the temperature of the compartment 15. Likewise although the circulation of air within the compartment 14 will be very limited, there will obviously be a deposit of frost on the plate 31. This may also be removed without substantially changing the temperature of that compartment by scraping the plate. It will thus be apparent that relatively low temperatures may be maintained in both the display compartment 14 and the storage compartment 15 continuously for an an indefinite period of time.

We claim:

A unitary refrigerated show and storage case for low temperature refrigeration comprising a cabinet having heat insulating walls, the upper portion of the cabinet walls being transparent for display purposes, an insulated door providing access to the display portion of the cabinet, an impervious refrigerated floor for the display portion forming the ceiling for the lower portion, additional refrigerating means embedded in the lower insulated walls, said lower portion providing a storage compartment for storing a supply of the food displayed, an insulated door providing access to the storage compartment and a smooth inner lining thermally associated with said refrigerating means whereby frost may be conveniently removed.

CHARLES C. THOMAS.
DON G. ELLIS.